US012591436B2

(12) United States Patent
Singh et al.

(10) Patent No.: US 12,591,436 B2
(45) Date of Patent: Mar. 31, 2026

(54) DONGLE-LESS WIRELESS HUMAN INTERFACE DEVICE (HID) PAIRING DURING DATA PROCESSING SYSTEM IN PREBOOT

(71) Applicant: Dell Products L.P., Round Rock, TX (US)

(72) Inventors: Ankit Singh, Bangalore (IN); Shrikant U. Hallur, Bangalore (IN); Naveen Awasthy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 120 days.

(21) Appl. No.: 18/618,323

(22) Filed: Mar. 27, 2024

(65) Prior Publication Data

US 2025/0306951 A1 Oct. 2, 2025

(51) Int. Cl.
*G06F 9/4401* (2018.01)

(52) U.S. Cl.
CPC .......... *G06F 9/4411* (2013.01); *G06F 9/4405* (2013.01)

(58) Field of Classification Search
CPC .............................. G06F 9/4411; G06F 9/4405
See application file for complete search history.

(56) References Cited

U.S. PATENT DOCUMENTS

| | | | | | |
|---|---|---|---|---|---|
| 6,163,849 | A | * | 12/2000 | Nouri | G06F 11/0748 |
| | | | | | 714/E11.2 |
| 6,668,376 | B1 | * | 12/2003 | Wang | G06F 9/4415 |
| | | | | | 717/178 |
| 6,854,054 | B1 | | 2/2005 | Kavanagh | |
| 7,130,997 | B2 | | 10/2006 | Hsu | |
| 8,136,900 | B2 | | 3/2012 | Iwasaki | |
| 8,346,985 | B2 | * | 1/2013 | Chassot | G06F 13/102 |
| | | | | | 710/8 |
| 9,152,402 | B2 | | 10/2015 | Scheidel et al. | |
| 9,875,115 | B2 | | 1/2018 | Russinovich | |
| 9,990,325 | B2 | * | 6/2018 | Hetzler | G06F 21/56 |
| 10,901,627 | B1 | | 1/2021 | Bshara | |

(Continued)

OTHER PUBLICATIONS

Seongwook, Jin et al., "Architectual Support for Secure Virtualization under a Vulnerable Hypervisor", 2011 44th Annual IEEE/ACM International Symposium on Microarchitecture (Micro), Porto Alegre, Brazil, 2011, pp. 272-283 (12 pages).

*Primary Examiner* — Aurel Prifti

(74) *Attorney, Agent, or Firm* — WOMBLE BOND DICKINSON (US) LLP

(57) ABSTRACT

Methods and systems for managing data processing systems during a startup process of the data processing systems are disclosed. A human interface device (HID) is paired with a management controller of a data processing system instead of a dongle device is configured as a pair with the HID. No dongle devices are connected or plugged into any external-facing ports of the data processing system. The management controller includes a processor that operates separately and independently from a main processor of the data processing system that is responsible for initiating and executing a bootup sequence of the data processing system. The data processing system, while still in the startup process before an operating system (OS) of the data processing system is fully booted and operational, is controlled by the HID through the management controller instead of the non-existent dongle device.

20 Claims, 10 Drawing Sheets

(56) References Cited

U.S. PATENT DOCUMENTS

| | | | | |
|---|---|---|---|---|
| 11,212,123 B2* | 12/2021 | Yoon | .................. | H04W 52/0229 |
| 11,282,161 B2 | 3/2022 | Ray et al. | | |
| 11,489,827 B2 | 11/2022 | Knotwell et al. | | |
| 11,556,359 B2 | 1/2023 | Hart et al. | | |
| 11,768,781 B2 | 9/2023 | Cooray et al. | | |
| 11,770,246 B2* | 9/2023 | Ong | ...................... | G06F 21/575 |
| | | | | 713/2 |
| 11,775,651 B2* | 10/2023 | Jacobs | .................. | G06F 21/572 |
| | | | | 713/2 |
| 12,299,184 B2* | 5/2025 | Wheeler | .............. | H04L 63/083 |
| 12,353,609 B2 | 7/2025 | Nelogal | | |
| 2004/0210897 A1 | 10/2004 | Brockway | | |
| 2007/0198996 A1* | 8/2007 | Chiu | ...................... | G06F 9/4411 |
| | | | | 719/321 |
| 2009/0054045 A1 | 2/2009 | Zakrzewski | | |
| 2011/0055541 A1* | 3/2011 | Lee | ...................... | G06F 9/4418 |
| | | | | 713/375 |
| 2012/0023319 A1 | 1/2012 | Chin | | |
| 2012/0060023 A1 | 3/2012 | Park | | |
| 2013/0276144 A1 | 10/2013 | Hansen | | |
| 2016/0364297 A1 | 12/2016 | Lo | | |
| 2018/0032349 A1 | 2/2018 | Bhimanadhuni | | |
| 2019/0068772 A1* | 2/2019 | Lo | ........................... | H04W 4/80 |
| 2020/0074083 A1 | 3/2020 | Hou | | |
| 2020/0242051 A1 | 7/2020 | Bisa | | |
| 2020/0244445 A1 | 7/2020 | Ponnusamy | | |
| 2020/0250293 A1 | 8/2020 | Paulraj | | |
| 2020/0356669 A1 | 11/2020 | Kim | | |
| 2021/0034132 A1* | 2/2021 | Hamlin | ................. | G06F 1/3287 |
| 2021/0099519 A1 | 4/2021 | Christian | | |
| 2022/0222349 A1 | 7/2022 | Lambert | | |
| 2023/0132176 A1 | 4/2023 | Nelogal | | |
| 2023/0136229 A1 | 5/2023 | Lee | | |
| 2023/0229454 A1* | 7/2023 | Lagnado | .............. | H04W 4/029 |
| | | | | 713/2 |
| 2023/0259291 A1 | 8/2023 | Porzio | | |
| 2023/0259472 A1* | 8/2023 | Azam | ................... | G06F 9/4411 |
| | | | | 710/113 |
| 2023/0297261 A1 | 9/2023 | Kim | | |
| 2024/0362370 A1 | 10/2024 | Jain | | |

* cited by examiner

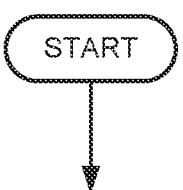

START

Obtain, by a management controller of a data processing
system and while the data processing system is in a preboot state,
input instructions from a human interface device (HID) paired
with the management controller.
Operation 310

Provide, by the management controller, the input instructions
to hardware resources of the data processing system for the hardware
resources to execute the input instructions thereby effectuating user
interaction with the data processing system through the HID while the
data processing system is in the preboot state.
Operation 312

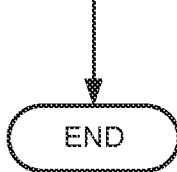

END

FIG. 3B

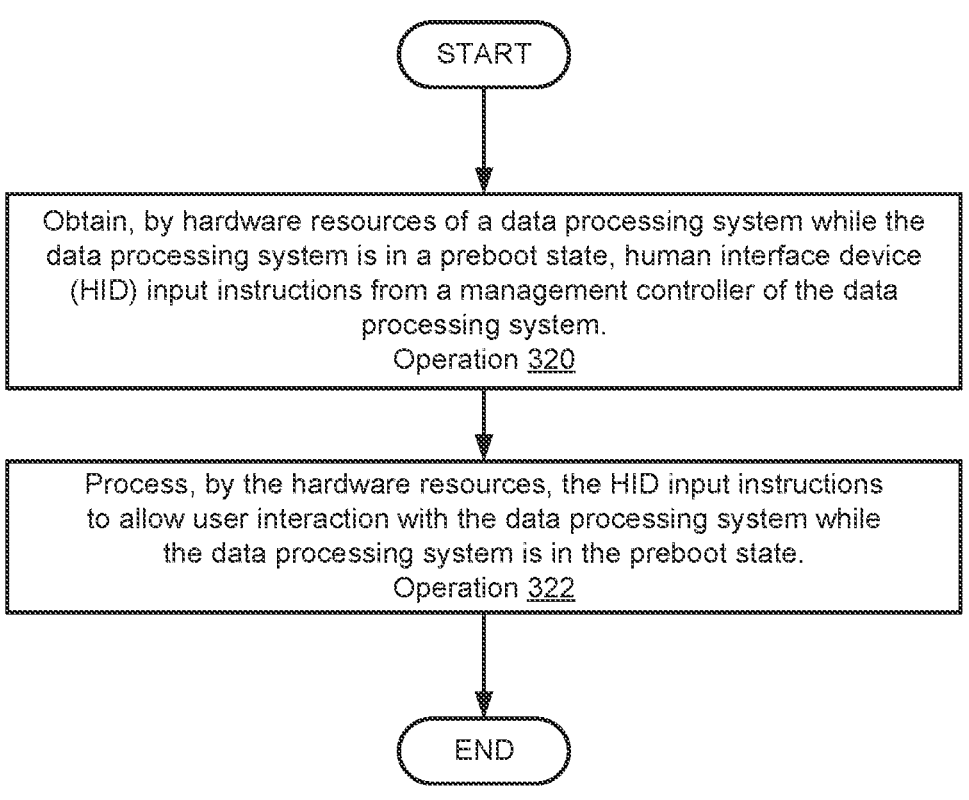

START

Obtain, by hardware resources of a data processing system while the data processing system is in a preboot state, human interface device (HID) input instructions from a management controller of the data processing system.
Operation 320

Process, by the hardware resources, the HID input instructions to allow user interaction with the data processing system while the data processing system is in the preboot state.
Operation 322

END

FIG. 3C

DONGLE-LESS WIRELESS HUMAN INTERFACE DEVICE (HID) PAIRING DURING DATA PROCESSING SYSTEM IN PREBOOT

Embodiments disclosed herein relate generally to wireless human interface device (HID) pairing and device startup. More particularly, embodiments disclosed herein relate to systems and methods to manage wireless HID pairing and usage with a computing device during a startup process of the computing device.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components and the components of other devices may impact the performance of the computer implemented services. Users may input commands and interact with computing devices using HIDs.

BRIEF DESCRIPTION OF THE DRAWINGS

Embodiments disclosed herein are illustrated by way of example and not limitation in the figures of the accompanying drawings in which like references indicate similar elements.

FIGS. 3A-3C show flowcharts in accordance with one or more embodiments.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

Figure 4:
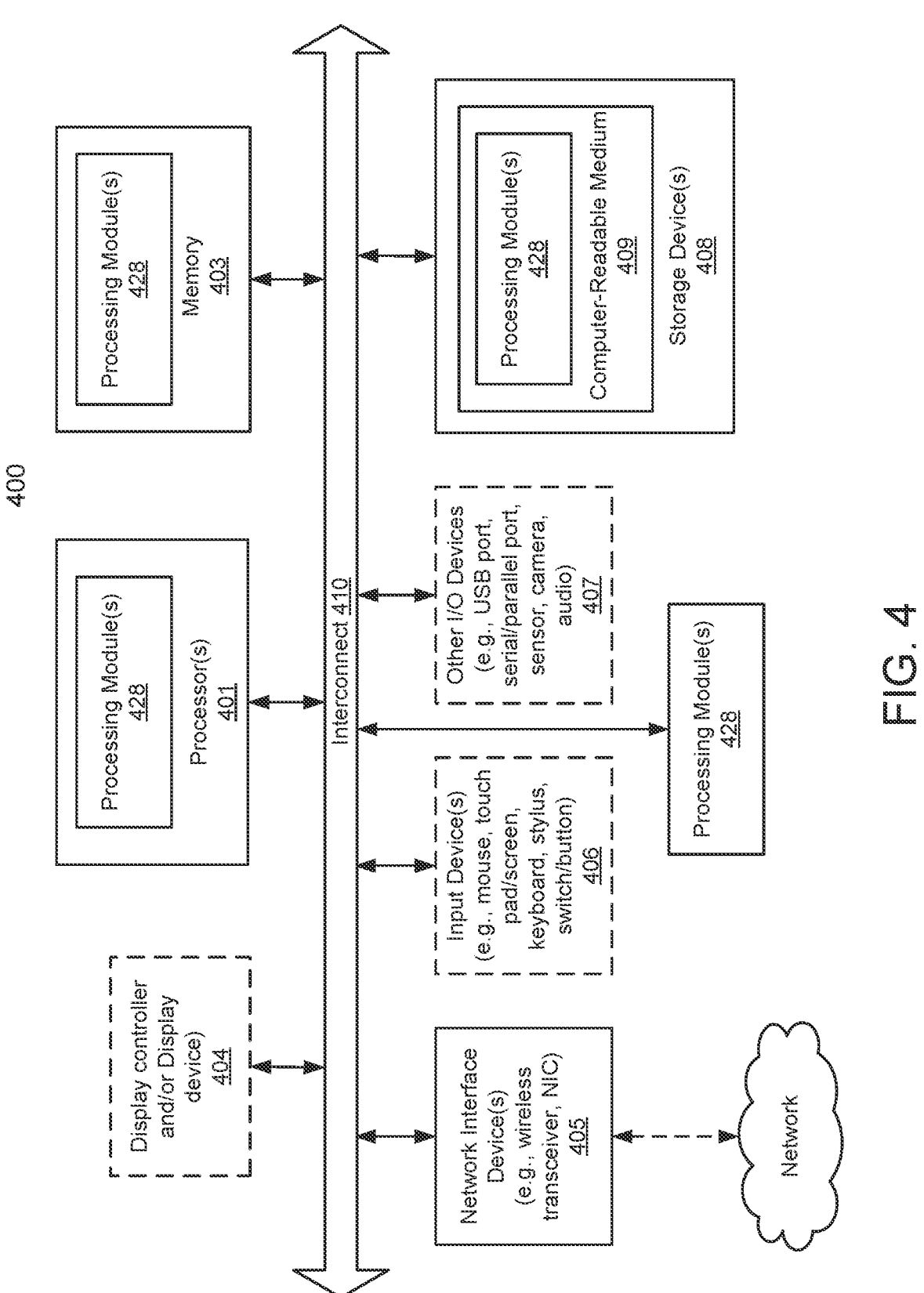
FIG. 4 shows a block diagram illustrating a computing device in accordance with one or more embodiments.

In general, embodiments disclosed herein relate to methods and systems for managing a data processing system (such as computing devices, as described below in reference to FIG. 4) during a boot up process (e.g., a startup and/or a preboot stage/state) of the data processing system.

In particular, during a boot up process of the data processing system, several functionalities of the data processing system (e.g., network connection functions, wireless communication capabilities, or the like) are not going to be available. More specifically, functions that are tied to (e.g., dependent of) the operating system (OS) of the data processing system are not available to a user of the data processing system until the OS has been fully booted up (e.g., in a state that is ready to be used) by the hardware resources (e.g., hardware components) of the data processing system.

Such limitations may cause issues and inconveniences to users of the data processing system during the boot up process. For example, connectivity to wireless devices (e.g., wireless human interface devices (HIDs) such as a wireless mouse or keyboard) will not be available during the boot up process unless the wireless devices are paired to the data processing system using a separate device (e.g., a dongle device). In one example, this may be because the wireless capabilities (also referred to herein as "wireless device connection capabilities") of the data processing system such as a Bluetooth® connection through a Bluetooth® enabled chip may not be turned on until the OS has been fully booted up. Said another way, during the preboot stage before the OS is fully functional (including when a user is accessing a Basic Input/Output System (BIOS) of the data processing system) the functions of the Bluetooth® enabled chip have not yet been enabled (e.g., turned on) because the OS is still technically off and not ready to run (e.g., execute) one or more programs (and/or applications, codes, functions, or the like) tied to (e.g., that controls) the Bluetooth® enabled chip.

As a result, if the separate device (e.g., the dongle device) that allows connection of the HID to the data processing system during the preboot process (and/or preboot stage) is lost (e.g., by the user or by any other individual/entity other than the user), the HID is unusable during the preboot process until the OS is fully booted up. For example, wireless keyboards and mouses (e.g., Bluetooth® enabled keyboards and mouses) are not useable to configure a computing device's BIOS without a dongle device to facilitate the connection between the wireless mouse and keyboard with the computing device. This not only creates an inconvenience for the user but also limits the functionalities and capabilities of the data processing system while the data processing system is in the preboot stage (also referred to herein as "preboot state").

To resolve the above-discussed inconveniences and limitations of the data processing system, a separate device (e.g., a system-on-a-chip) with wireless device connection capabilities that are not dependent on the OS of the data processing system is provided internally within the data processing system. As a result, a dongle-less connection to wireless HIDs can still be established even if the OS is not fully booted up and ready for use.

Additionally, because such a device is installed within the data processing system, unlike externally connected dongle devices, there is no possibility of losing this device (e.g., dropped, misplaced, or the like). Thus, an improved data processing system that allows HID pairing and use during the boot up process without a dongle device is obtained.

Thus, embodiments disclosed herein may provide, among others an improvement to the above-discussed inconveniences and limitations of existing data processing systems (e.g., an existing technical problem in the present technical field of embodiments disclosed herein).

Embodiments disclosed herein also resolve a long felt need in the industry of shipping data processing systems (and/or HID kits) without a dongle device. In particular, accessories such as the dongle devices may be easily lost or forgotten to be included during packaging and shipping. These dongle devices may also attribute to significant costs of the sellers of the product, and may also create waste. For example, in an attempt to reduce significant costs and improve quality control, multiple corporations (e.g., Apple Inc., or the like) have stopped including one or more accessories (e.g., headphones, charger adapters, or the like) within a product's packaging. Thus, eliminating the need to include a dongle device in every product shipment resolves the above long-felt needs in the tech industry.

In an embodiment, a method is provided. The method may include: obtaining, by a management controller installed within a data processing system and while the data processing system is in a preboot state, input instructions from a human interface device (HID) that is wirelessly paired with the data processing system through the management controller instead of through a dongle device configured for the HID; and providing, by the management controller, the input instructions to hardware resources installed within the data processing system to cause the hardware resources to execute the input instructions while the data processing system is in the preboot state.

The hardware resources comprise a first processor of the data processing system that is responsible for initiating and executing a bootup sequence of the data processing system. The management controller comprises a second processor of the data processing system, the second processor being separate and independent from the first processor.

The first processor is a main processor on which an operating system (OS) of the data processing system runs, and the management controller is unable to execute the bootup sequence of the data processing system.

The management controller is a system-on-a-chip that operates independently of the first processor of the data processing system.

The dongle device is not connected to the data processing system while the management controller is paired with the HID, and the HID is a Bluetooth® device.

In the preboot state, the data processing system is displaying a Basic Input/Output System (BIOS) of the data processing system to a user of the data processing system.

The method may further include, before obtaining the input instructions: obtaining, by the management controller and while the data processing system is in the preboot state or in a powered-off state, device pairing information from a human interface device (HID); and using, by the management controller, the device pairing information to pair the management controller with the HID while the data processing system is still in the preboot state and while the dongle device configured for the HID is not connected to the data processing system.

The hardware resources are configured with first wireless device connection capabilities, the first wireless device connection capabilities being off until the data processing system reaches a fully booted state after completing one or more actions required to be executed during the preboot state. The management controller is configured with second wireless device connection capabilities that are separate and independent from the first wireless device connection capabilities, the second wireless device connection capabilities being on while the data processing system is in the preboot state, and the HID is paired with the management controller while the data processing system is in the preboot state using the second wireless device connection capabilities.

A start up of an operating system (OS) of the data processing system is not complete until the data processing system reaches the fully booted state. Once the data processing system reaches the fully booted state, the method may further include: providing, by the management controller, an HID profile of the HID to the hardware resources to automatically pair the HID paired with the management controller to the hardware resources without user intervention.

Automatically pairing the HID to the hardware resources comprises terminating, by the management controller, a first wireless connection between the management controller and the HID to allow a second wireless connection to be formed between the HID and the hardware resources, the first and second wireless connections being Bluetooth® connections.

A non-transitory media may include instructions that when executed by at least one of one or more processors of a data processing system cause the computer-implemented method to be performed by the data processing system.

A data processing system may include the non-transitory media and one or more processors, and may perform the computer-implemented method when at least one of the one or more processors executes the instructions in the non-transitory media.

Figure 1A:
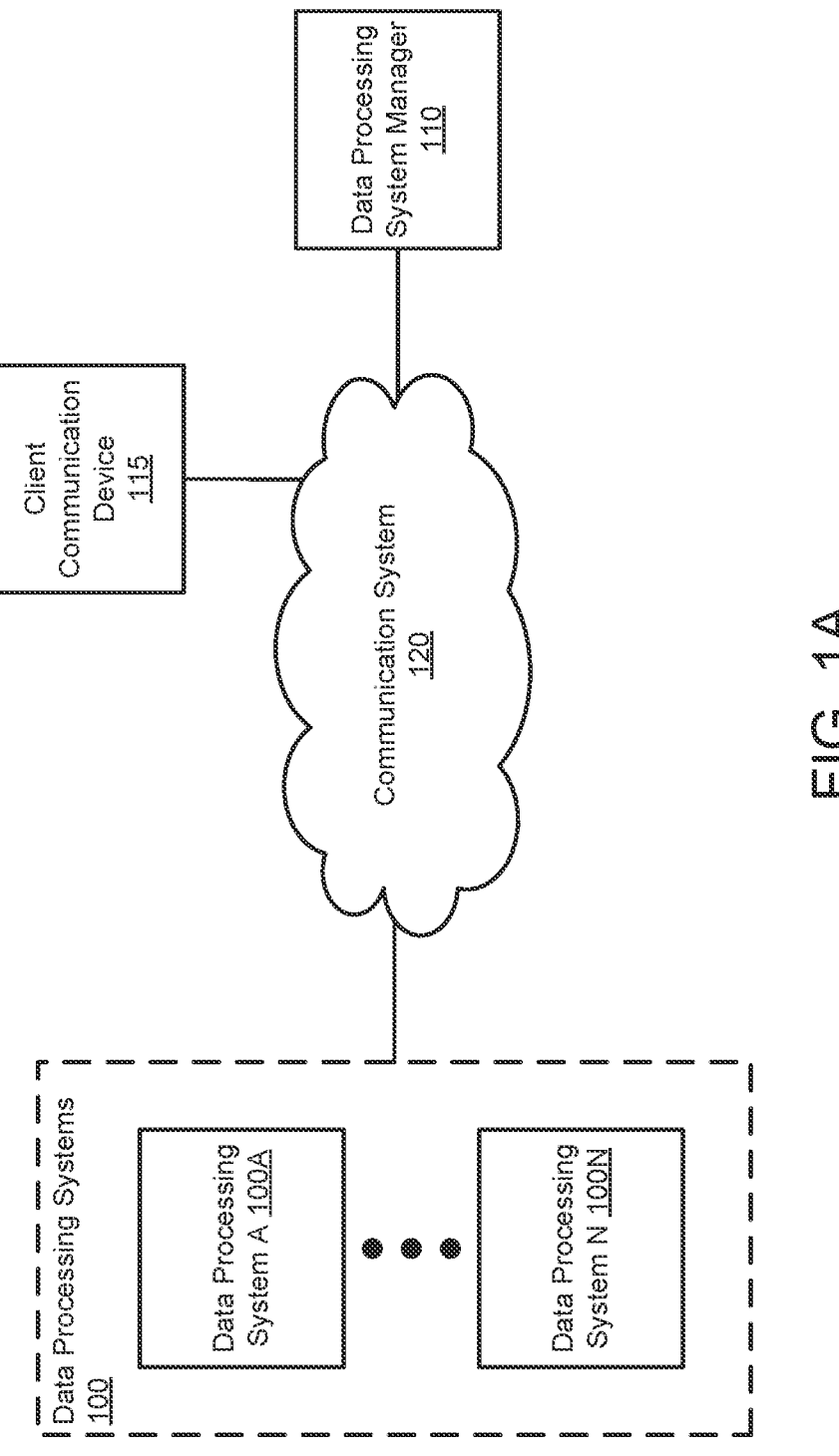
FIG. 1A shows a block diagram illustrating a system in accordance with one or more embodiments.

Turning to FIG. 1A, a block diagram illustrating a system 100 in accordance with an embodiment is shown. The system 100 shown in FIG. 1A may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may include any number of data processing systems 100 (e.g., data processing systems 100A-100N). Data processing systems 100 may provide the computer implemented services to users of data processing systems 100 and/or to other devices (not shown). Different data processing systems may provide similar and/or different computer implemented services.

To provide the computer implemented services, data processing systems 100 may include various hardware components (e.g., processors, memory modules, storage devices, etc.) and host various software components (e.g., operating systems, application, startup managers such as basic input-output systems, etc.). These hardware and software components (discussed in more detail below in FIG. 1B) may provide the computer implemented services via their operation.

The software components may be implemented using various types of services. For example, each data processing system of the data processing systems 100 may host various services that provide the computer implemented service (e.g., application services) and/or that manage the operation of these services (e.g., management services). The aggregate (e.g., combination) of the management and application services may be a complete service that provide desired functionalities.

To manage the data processing systems 100, the system of FIG. 1A may include data processing system manager 110.

Data processing system manager 110 may include various hardware components (e.g., processors, memory modules, storage devices, etc.) and host various software components (e.g., operating systems, application, startup managers such as basic input-output systems, etc.). These hardware and software components may provide the functionalities (e.g., the communication with and management of the data processing systems) of the data processing system manager 110.

In one example, the data processing system manager 110 may be a computing device (e.g., computing device of FIG. 4) such as a desktop computer or server that is used by used by manufacturers (or distributors, administrators, etc.) of one or more components installed within the data processing systems 100 to communicate with and manage (namely, the components installed within) the data processing systems 100.

The system of FIG. 1A may also include a client communication device 115. The client communication device 115 may be any type of computing device (e.g., computing device of FIG. 4) owned by a user of any of the data processing systems 100. More specifically, the client communication device 115 may be a computing device used by a user of a data processing system (e.g., data processing system A 100A) to communicate with the data processing system manager 110 when the data processing system A 100A is offline or broken (e.g., when a component and/or device within the data processing system A 100A is broken and needs replacement). For example, the client communication device 115 may be the user's work laptop or desktop computer, a tablet computer, a smartphone, or another (still working/functioning) data processing system (e.g., data processing system N 100N) among the data processing systems 100. As another example, the client communication device 115 may be the data processing system (e.g., data processing system A 100A) that needs a pairing to one or more human interface devices (HIDs).

In embodiments, the HID may be any type of wired and/or wireless device used by a user of a data processing system (e.g., data processing system A 100A) that takes inputs from the user and/or provides outputs to the user. For example, the HID may be, but is not limited to: a keyboard; a refreshable braille display; a pointing device such as a mouse, a trackball, a touchpad, a pointing stick, a light pen, or the like; a touchscreen; a magnetic stripe reader; a graphics tablet; a joystick, a gamepad, an analog stick; a webcam; a fingerprint scanner; or the like. The HID may also include any of the input devices 406 and/or I/O devices 407 discussed below in reference to FIG. 4 without departing from the scope of embodiments disclosed herein.

In embodiments, the HID may wirelessly communicate with the data processing systems 100 using any form of long-range and/or short-range wireless communication mechanism (e.g., Bluetooth®, Near Field Communication (NFC), Radio Frequency Identification (RFID); or the like).

Any of the components illustrated in FIG. 1A may be operably connected to each other (and/or components not illustrated) with communication system 120. In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the Internet Protocol).

While FIG. 1A is illustrated as including a limited number of specific components, a system in accordance with an embodiment may include fewer, additional, and/or different components than those illustrated therein.

Figure 1B:
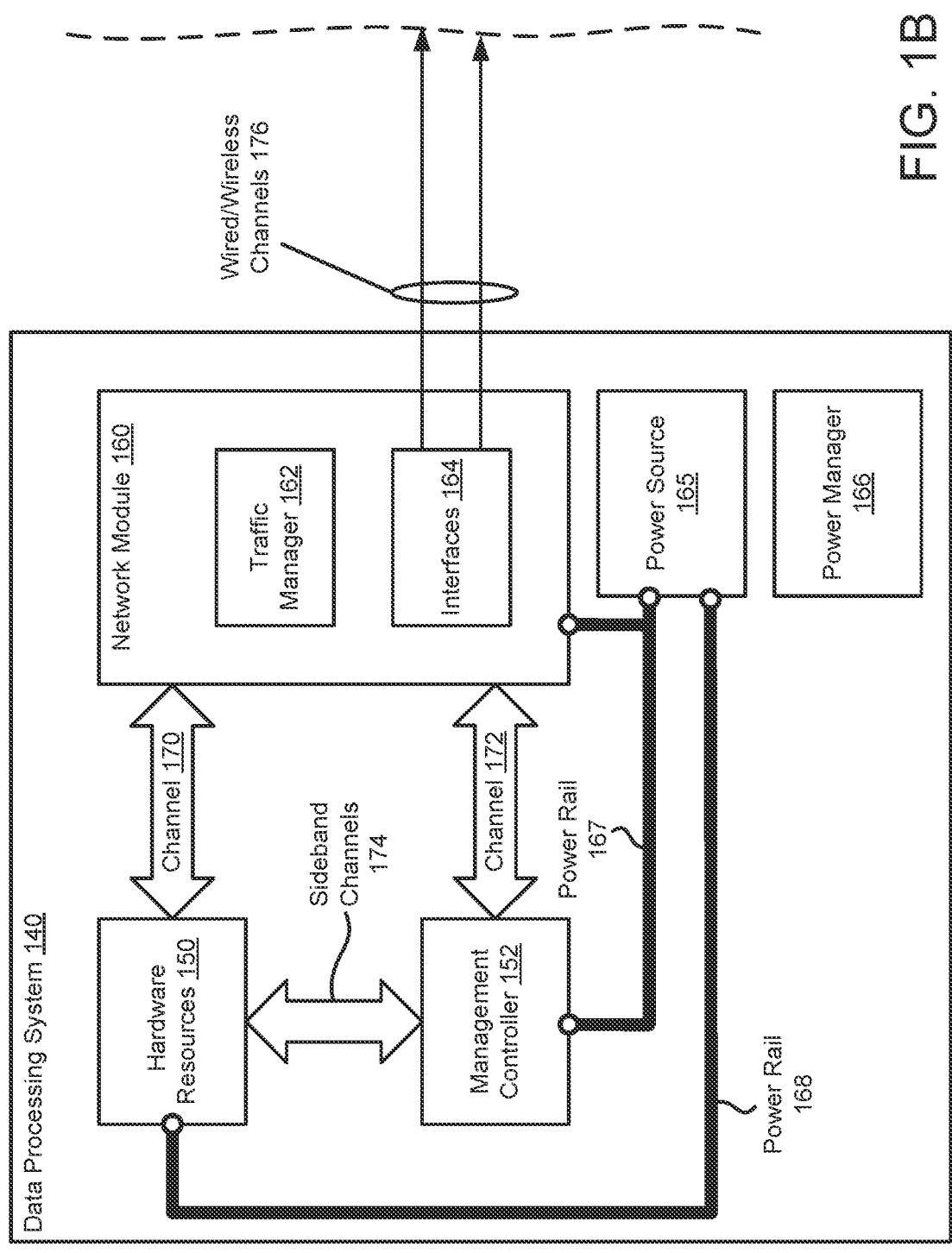
FIG. 1B shows a block diagram illustrating a data processing system in accordance with one or more embodiments.

Turning to FIG. 1B, a diagram illustrating data processing system 140 in accordance with an embodiment is shown. Data processing system 140 may be similar to any of the data processing systems 100 (e.g., any one of data processing systems 100A-100N) shown in FIG. 1A.

To provide computer implemented services, data processing system 140 may include any quantity of hardware resources 150. Hardware resources 150 may be in-band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

In embodiments, the processor making up one of the hardware resources 150 of the data processing system 140 may be responsible for initiating and executing a bootup sequence of the data processing system. Additionally, this processor making up one of the hardware resources 150 of the data processing system 140 may be a main processor on which an operating system (OS) of the data processing system runs.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer implemented services. The applications may utilize various services provided by the management entities and use (at least indirectly) the network stack to communication with other entities.

In embodiments, the processor (of the hardware resources 150) may be a main processor (e.g., the central processing unit (CPU) and motherboard on which the CPU is installed) of the data processing system 140. The processor (of the hardware resources 150), may also be the main processor on which an operating system (OS) of the data processing system 140 is stored and runs.

In embodiments, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 140) to another device via any number of intermediate networks (e.g., via wired/wireless channels 176 that are part of the networks).

To reduce the likelihood of the applications and/or other in-band entities from being indirectly compromised, data processing system 140 may include management controller 152 and network module 160. Each of these components of data processing system 140 is discussed below.

Management controller 152 may be implemented, for example, using a system-on-a-chip or other type of independently operating computing device (e.g., independent from the in-band components, such as hardware resources 150, of a data processing system 140). Management controller 152 may provide various management functionalities for data processing system 140. For example, management controller 152 may monitor various ongoing processes performed by the in-band component, may manage power distribution, thermal management, and/or other functions of data processing system 140.

In embodiments, the management controller 152 may include its own processor (and memory) that are separate and independent from the processor and memory making up the hardware resources 150 of the data processing system 140. This processor of the management controller 152 may not be configured to store an image of the OS. Thus, this processor of the management controller 152 may not be able to execute the bootup sequence of the data processing system (but may cause the processor making up the hardware resources 150 to initiate and execute the bootup sequence).

To do so, management controller 152 may be operably connected to various components via sideband channels 174 (in FIG. 1B, a limited number of sideband channels are included for illustrative purposes, it will be appreciated that management controller 152 may communication with other components via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly processes may be used to facilitate outbound communications from the applications.

Management controller 152 may be operably connected to communication components of data processing system 140 via separate channels (e.g., 172) from the in-band components, and may implement or otherwise utilize a distinct and independent network stack (e.g., TCP/IP). Consequently, management controller 152 may communication with other devices (e.g., via, WiFi, infrared, Bluetooth®, WiMax, wireless cellular telephony, satellite, global positioning system (GPS), radio frequency (RF), near field communications (NFC), or the like) independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

For example, in embodiments, the management controller 152 may include its own Bluetooth® enabled chip (and/or any other types of transceivers) that is separate and independent from another Bluetooth® enabled chip that is part of the hardware resources 150 of the data processing system 140. Said another way, the management controller is configured with wires device communication capabilities that are independent and separate from the default wireless device connection capabilities (e.g., provided using the hardware resources 150 and/or the network module 160) of the data processing system 140.

To facilitate communication with other devices, data processing system 140 may include network module 160. Network module 160 may provide communication services for in-band components and out-of-band components (e.g., management controller 152) of data processing system. To do so, network module 160 may include traffic manager 162 and interfaces 164.

Traffic manager 162 may include functionality to (i) discriminate traffic directed to various network endpoints advertised by data processing system 140, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, and/or other types of communication components. These component may support any number of wired/wireless channels 176.

Thus, from the perspective of an external device, the in-band components and out-of-band components of data processing system 140 may appear to be two independent network entities, that may independently addressable, and otherwise unrelated to one another.

To facilitate management of data processing system 140 over time, hardware resources 150, management controller 152 and/or network module 160 may be positioned in separately controllable power domains. By being positioned in these separately power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

For example, management controller 152 and network module 160 may remain powered and functional as long as the data processing system 140 is physically connected to a power source (or an internal battery of the data processing system 140 (e.g., a laptop battery) still carries a charge) even if the actual data processing system 140 is powered-off (e.g., shut down). While the data processing system 140 is powered-off, no power is supplied to the hardware resources 150. Such a configuration allows the management controller 152 to receive and execute (e.g., perform) one or more instructions from the data processing system manager 110 even while the data processing system 140 is powered-off, which advantageously allows the seller (and/or manufacturer, producer, or the like) of the data processing system 140 to repair, troubleshoot, and/or update the data processing system 140 even while the data processing system 140 is powered-off and/or while the data processing system 140 cannot be turned-on (e.g., cannot be turned-on at all, the OS cannot be fully booted up, or the like) as a result of failure of one or more of the hardware resources 150 (or as a result of corrupted and/or damaged OS images/files).

To implement the separate power domains, data processing system 140 may include a power source (e.g., 165) that separately supplies power to power rails (e.g., 167, 168) that power the respective power domains. Power from the power source (e.g., a power supply, battery, etc.) may be selectively provided to the separate power rails to selectively power the different power domains. A power manager (e.g., 166) may manage power from power source 165 is supplied to the power rails. Management controller 152 may cooperate with power manager 166 to manage supply of power to these power domains.

In FIG. 1B, an example implementation of separate power domains using power rails 167-168 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

Turning to FIGS. 2A-2D, data flow diagrams in accordance with one or more embodiments are provided. The data flow diagrams of FIGS. 2A-2D show a process for managing a data processing system (such as computing devices, as described below in reference to FIG. 4; data processing system 140, FIG. 1B; any of data processing systems 100A-100N, FIG. 1A) during a boot up process (e.g., a startup and/or a preboot stage/state) of the data processing system.

Although FIGS. 2A-2D will be described below specifically in the context of using Bluetooth® enabled HIDs (e.g., a Bluetooth® mouse, a Bluetooth® keyboard, or the like), embodiments herein are not limited to Bluetooth® enabled HIDs. In particular, one of ordinary skill would appreciate that the processes discussed below may be applied to any type of wireless HIDs that communicate using any type of wireless communication method (e.g., via, WiFi, infrared, Bluetooth®, WiMax, wireless cellular telephony, satellite, global positioning system (GPS), radio frequency (RF), near field communications (NFC), or the like) independently of any of the in-band components (e.g., does not rely on any hosted software, hardware components, etc.) without departing from the scope of embodiments disclosed herein.

Figure 2A:
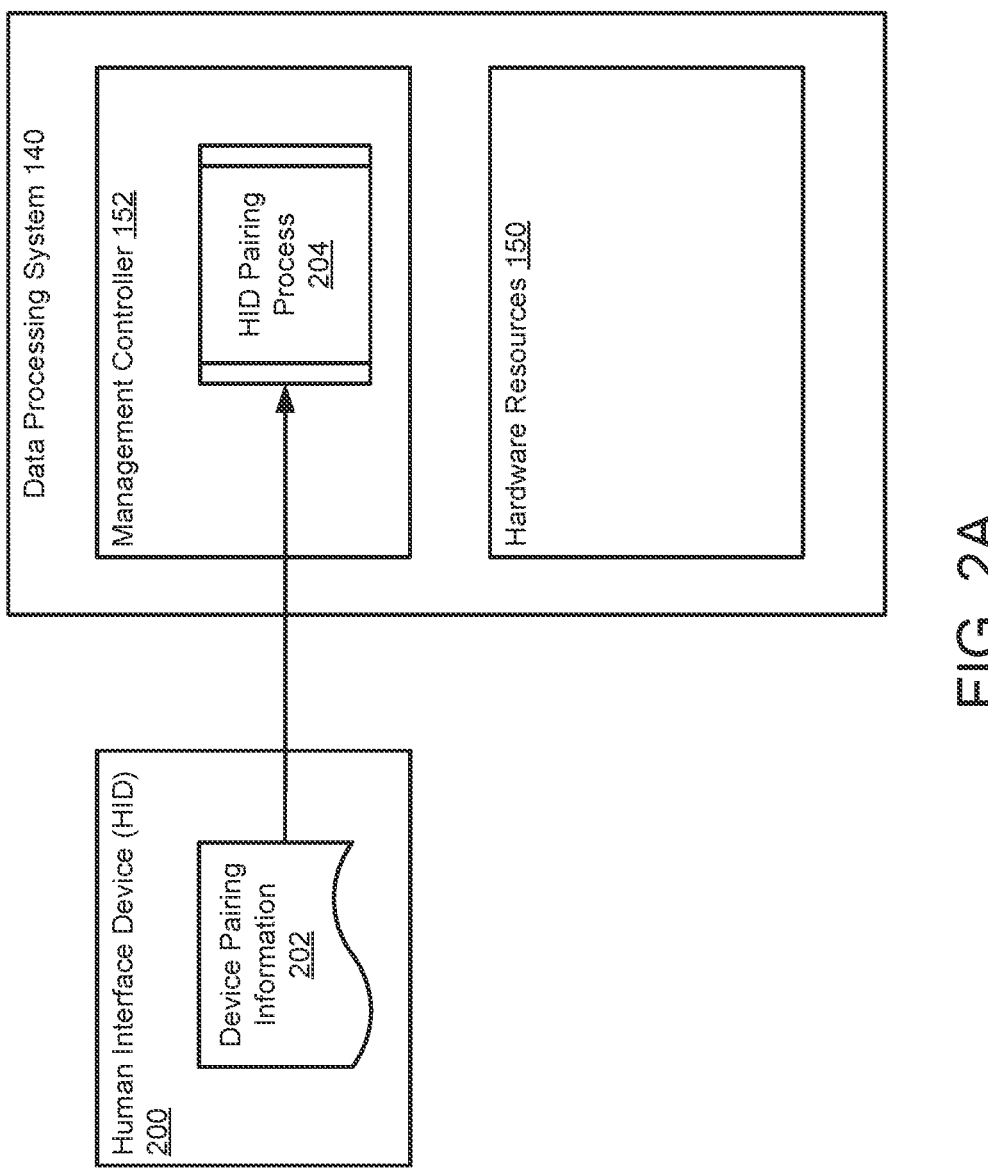
FIGS. 2A-2D show data flow diagrams in accordance with one or more embodiments.

Starting with FIG. 2A, an HID 200 may be paired (or be in the process of pairing) with a management controller 152 of a data processing system 140. The HID may be paired (or be in the process of pairing) with the management controller 152 using the wireless device connection capabilities of the management controller 152 discussed above in reference to FIG. 1B.

As shown in FIG. 2A, as part of the pairing process, the HID 200 may send device pairing information 202 to the management controller 152. The management controller 152 may receive the device pairing information and initiate an HID pairing process 204 to complete the pairing.

Using Bluetooth® has a non-limiting example, the HID 200 may be a Bluetooth® enabled keyboard that is sending all necessary files and information (e.g., firmware information, or the like) as the device pairing information. The management controller 152 may execute, as HID pairing process 204, any necessary processes and/or actions required to complete the Bluetooth® pairing with the HID 200.

In embodiments, such a pairing process shown in FIG. 2A may occur while the data processing system 140 is still at a manufacturing site (e.g., before being packaged and shipped, with the HID, to a consumer/user) operated by a producer/seller of the data processing system 140. Any way of pairing the HID 200 to the management controller 152 (e.g., pushing a pairing button on the HID 200 after the management controller 152 is caused enter a pairing mode, or the like) may be used without departing from the scope of embodiments disclosed herein.

In embodiments, such a pairing process may occur after a consumer/user has received the data processing system 140 (e.g., the user of the data processing system 140 uses client communication device 115 to contact the data processing system manager 110 to request pairing of the HID 200 to the data processing system 140, or the like). More specifically, as one example, the data processing system manager 110 may send instructions that cause the management controller 152 to enter a pairing mode, and a user may press a button on the HID 200 to cause the HID to pair with the management controller 152 that is currently in the pairing mode. Alternatively, a user may press a button on the HID 200 to cause the HID to enter a pairing mode while a user of the data processing system manager 110 (e.g., an administrator) may be remotely controlling the management controller 152 to pair with the HID 200 that is in pairing mode. Other similar or relevant pairing processes may be used without departing from the scope of embodiments disclosed herein.

In embodiments, in yet another example, the pairing process between the management controller 152 and the HID 200 may occur while the data processing system 140 is starting up. Since the management controller 152 works independently from the hardware resources 150 of the data processing system, the pairing process will not affect the startup process of the data processing system 140.

Once paired to the HID 200, the management controller 152 may have (e.g., may create, generate, or the like) a HID profile (e.g., a Bluetooth® profile) of the HID 200.

Figure 2B:
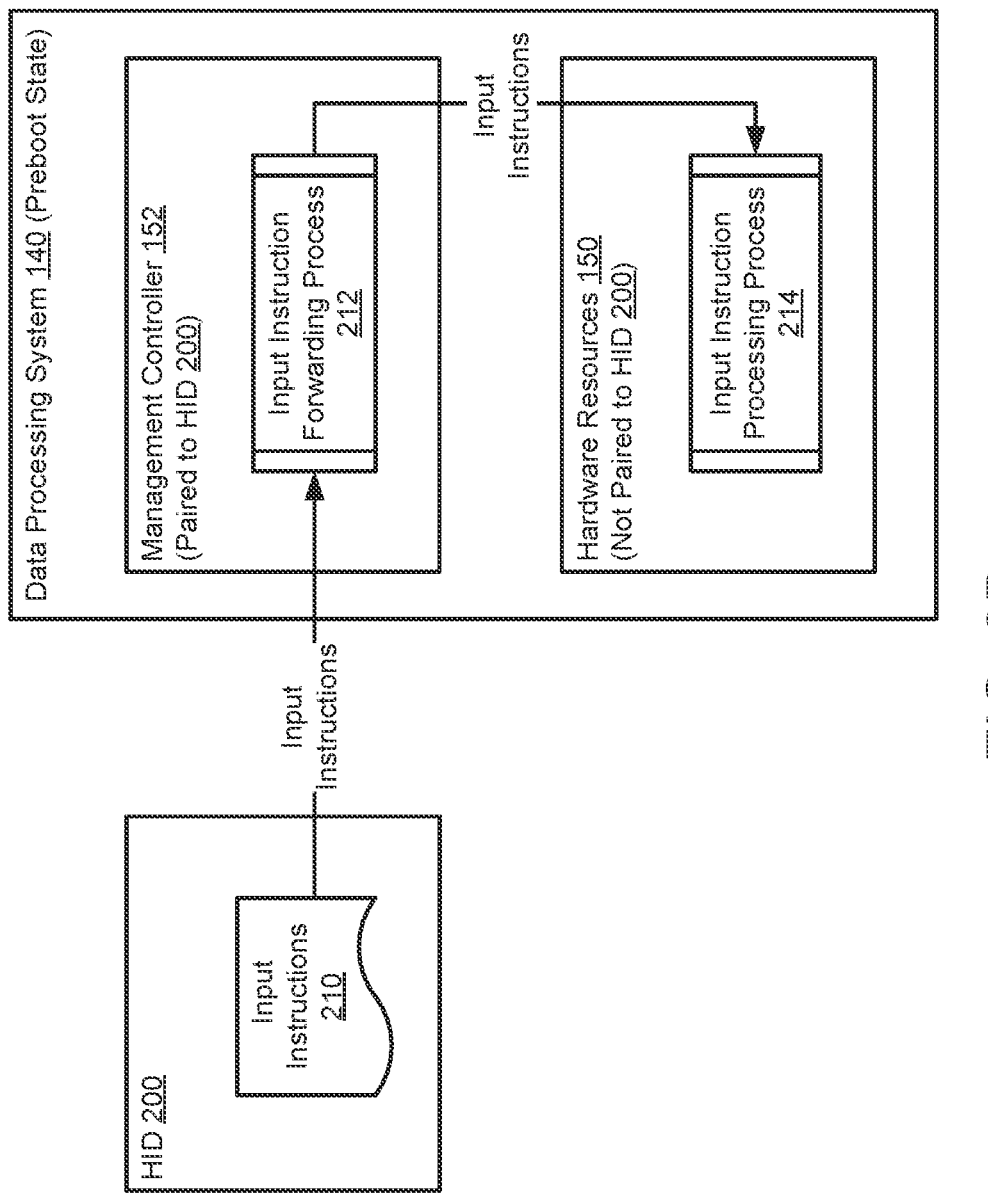

Turning now to FIG. 2B, a data processing system 140 may enter a preboot state upon being powered on by a user of the data processing system 140. During this preboot state, the hardware resources 150 may start execution of one or more processes and/or configurations required to boot up the OS of the data processing system 140.

Additionally, at this time when the data processing system 140 is first turned on (e.g., first powered on), the management controller 152 may already be paired with the HID 200 while the hardware resources 150 are not paired to the HID 200 (namely, the wireless device connection capabilities have not yet been enabled (e.g., turned off) since the OS is not yet fully booted up and operational). Further, no physical dongle devices (paired or not paired with the HID) are connected on any external portions (e.g., external portions of a case and/or chassis) of the data processing system 140.

While the data processing system 140 is in the preboot state, the user of the data processing system 140 may cause the HID to generate and transmit input instructions 210 to the management controller 152 to cause the data processing system 140 to perform one or more actions during the preboot state. For example, the user might press a key on the HID (here a Bluetooth® keyboard) to cause the data processing system 140 to boot to the BIOS. Pressing of the key on the HID 200 may cause the generation and transmission of the input instructions 210. Again, at this time when the key is pressed, there are still no physical dongle devices (paired or not paired with the HID) connected on any external portions of the data processing system 140.

The generated input instructions 210 may include any information and/or data required for the user's input commands on the HID 200 to be transmitted to the management controller 152 that is paired to the HID 200. For example, in this example where the HID 200 is a Bluetooth® keyboard, the input instructions may be sent in the form of a Bluetooth® Logical Link Control and Adaptation Layer Protocol (L2CAP) packet (or the like) that include the American standard code for information interchange (ASCII) data (or the like) of the key (or key(s)) pressed by the user. One of ordinary skill will appreciate that contents of the input instructions 210 will vary depending on the wireless communication format being used between the HID 200 and the management controller 152.

Once the management controller 152 obtains the input instructions 210, the management controller 152 may perform an input instruction forwarding process 212 that includes: (i) determining what the user input is (e.g., what key(s) are pressed on the Bluetooth® keyboard); and (ii) sending the results of this determination in a predefined format (e.g., a frame packet) to the hardware resources 150 (namely, the host) of the data processing system 140.

In embodiments, the actions and/or processes for determining what the user input is as part of the input instruction forwarding process 212 may depend on the communication method used. For example, if the communication method is Bluetooth® as discussed in this specific example, any appropriate actions and/or processes for processing Bluetooth® communications (e.g., Bluetooth® L2CAP packets) may be used.

Once the user input is determined, the user input will be transformed (e.g., wrapped in, added into, used to generate, or the like) one or more frame packets that will confer the user input to the hardware resources 150 (namely, the host) of the data processing system 140 for the hardware resources 150 (namely, the host) to reflect (e.g., apply, perform, show, or the like) the user input. Continuing with the above example of the user pressing a key to enter the system BIOS, the frame packet(s) transmitted from the management controller 152 to the hardware resources 150 may include information regarding the key pressed, which after being processed by the hardware resources 150 will cause the data processing system 140 (e.g., as part of input instruction processing process 214) to enter the BIOS.

In embodiments, as part of input instruction processing process 214, the hardware resources 150 will analyze and act on the information and/or data included in the frame packet(s) obtained from the management controller 152. Continuing with the above example of the user pressing a key to enter the system BIOS, the hardware resources 150 will (as part of input instruction processing process 214) analyze the frame packet(s) to determine that the user pressed the key to enter the BIOS and act on this determination to enter the BIOS as intended by the user.

This process in FIG. 2B advantageously allows the data processing system 140 to be paired with and receive user input from the HID 200 while being in the preboot state (while the OS is not yet fully booted up and operational) and without having a dongle device (paired with the HID) connected on an external portion of the data processing system 140. Essentially, the management controller 152 now takes the place of the external dongle device to facilitate communication between the data processing system 140 and the HID 200 while the data processing system 140 is in the preboot state. For instance, a user of the data processing system 140 who has lost the dongle device (paired with the HID 200) will now advantageously be able to use the HID 200 to bring up and configure the BIOS through using the management controller 152 instead of having to obtain (e.g., purchase, request, or the like) and/or re-program a new dongle device for the HID 200.

Figure 2C:
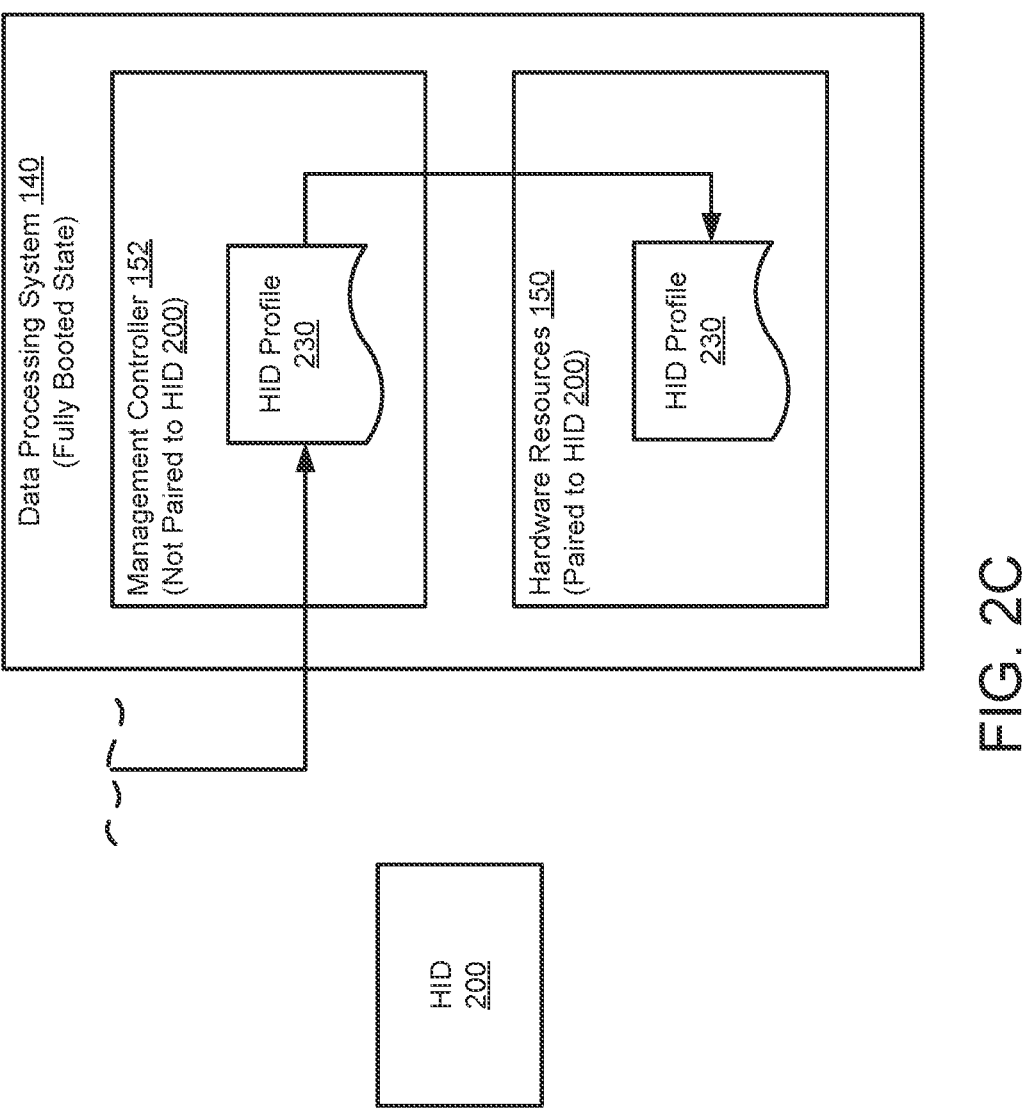

Turning now to FIG. 2C, FIG. 2C shows a point in time when the data processing system 140 has now entered into a fully booted state (e.g., when the OS is finally fully booted up and operational such as when a user log-in screen or a desktop is presented to a user of the data processing system 140). Upon entering the fully booted state, the management controller 152 transfers a HID profile 230 (e.g., a Bluetooth® profile, or the like) of the HID 200 to the hardware resources 150 and terminates its pairing with the HID 200. Said another way, upon the data processing system 140 entering the fully booted state, the management controller 152 (e.g., upon detecting, receiving a signal from the hardware resources 150, or the like that the data processing system 140 has entered the fully booted state), transfers the wireless pairing (e.g., the Bluetooth® pairing, or the like) with the HID 200 from the management controller 152 to the hardware resources 150.

Essentially, once the OS of the data processing system 140 has fully booted up and is fully operational, the default wireless device connection capabilities of the data processing system 140 (provided by the hardware resources 150) are now all enabled (e.g., turned on) and are able to be utilized. To prevent redundancy and wasting limited computing resources (and based on certain operating limitations of certain wireless communication methods/protocols), the HID 200 will only be paired with either management controller 152 or the hardware resources 150 at all times. Thus, when the hardware resources 150 reach a state that is able to connect (e.g., pair) with the HID 200, the pairing of the HID 200 will be transferred from the management controller 152 to the hardware resources 150.

Additionally, because the hardware resources 150 receive the HID profile 230 directly from the management controller 152, the transfer of the pairing is fully automatic and user is not required to manually re-pair the HID 200 to the hardware resources 150. Said another, the transfer of the HID profile 230 allows continuous and uninterrupted use of the HID 200 between the preboot state and the fully booted state without user intervention being required to re-pair the HID 200 to the hardware resources 150 once the data processing system 140 enters the fully booted state.

Essentially, in embodiments, before the OS is fully booted up and operational (e.g., while the default wireless device connection capabilities of the data processing system 140 are still off (e.g., disabled) and have not yet been turned on (e.g., enabled) by the OS), interfacing with the HID 200 is facilitated using the management controller 152. After the OS is fully booted up and operational, interfacing with the HID 200 is transferred to and now facilitated using the hardware resources 150 instead of using the management controller 152.

In the context of embodiments disclosed herein, a start up of an operating system (OS) of the data processing system 140 is not complete until the data processing system 140 reaches the fully booted state.

In embodiments, in FIGS. 2B-2C, since the management controller 152 may always be powered on (even when the hardware resources 150 are not) the HID 200 be in a paired state with management controller 152 while the data processing system 140 is powered off. For example, when the data processing system 140 is powered off and the pairing between the HID 200 and the hardware resources 150 is terminated, the management controller 152 may be config-ured to detect such termination of the pairing and re-pair with the HID. Alternatively, the management controller 152 may be configured to detect a power-on of the data process-ing system 140 and then initiate pairing with the HID 200 at this time. Other methods and timings of pairing and re-pairing the management controller 152 (e.g., as defined by a seller, manufacturer, designer, or the like of the data processing system 140) may be used without departing from the scope of embodiments disclosed herein.

Figure 2D:
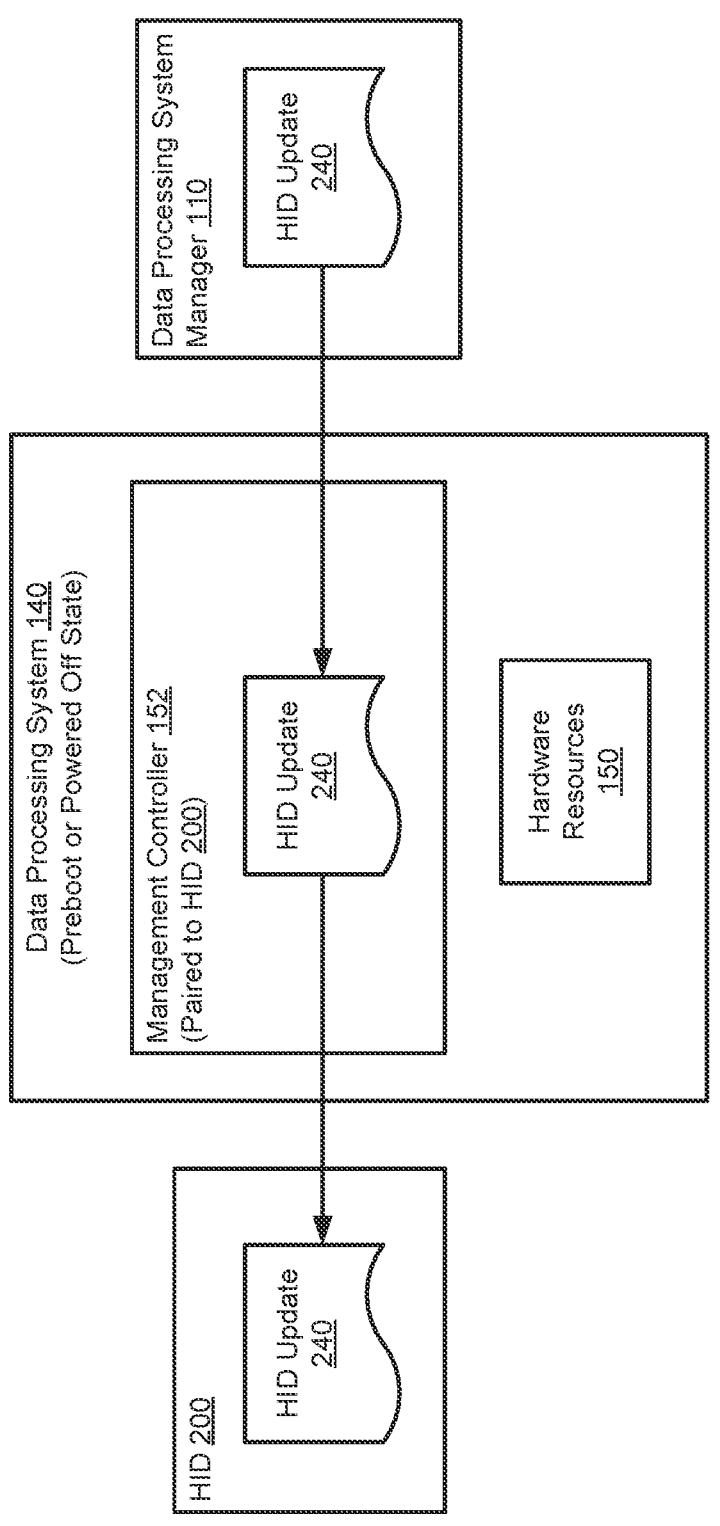

Turning now to FIG. 2D, during a preboot state of a powered off state of the data processing system 140, the management controller 152 may be used to receive firmware updates (or the like) regarding the HID 200 (e.g., in the form of HID update 240) from the data processing system man-ager 110. Once the management controller 152 receives the HID update 240, the management controller 152 may: (i) execute and apply the HID update 240; and (ii) provide the HID update 240 to the HID 200 for the HID to execute and apply the HID update 240. When the management controller 152 sends the HID profile 230 to the hardware resources 150 (at or upon entering the fully booted state of the data processing system 140), information and/or data included in the HID update will already be included in the HID profile 230. As a result, the transition of the pairing of the HID 200 between the management controller 152 and the hardware resources 150 may advantageously be continuous and unin-terrupted.

Because the hardware resources 150 will not have to execute and apply the HID update 240, limited computing resources of the hardware resources 150 may be saved to be used on the operations. Thus, the functionalities of the data processing system 140 (e.g., a computing device) may also be improved using the methods and systems of embodiments disclosed herein.

Figure 3A:
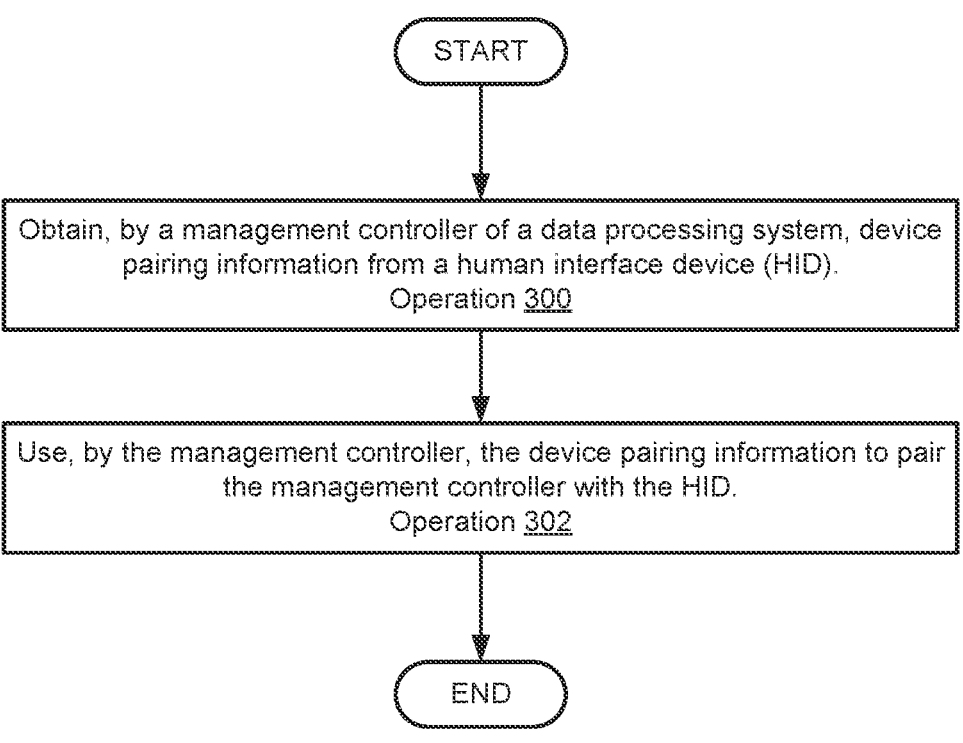

As discussed above, the components of FIGS. 1A-1B may perform various methods for managing a boot up process of a data processing system. FIGS. 3A-3C illustrate examples of methods that may be performed by the components of FIGS. 1A-1B. For example, any of the data processing systems 100 may perform all or a portion of the methods. In the diagrams discussed below and shown in FIGS. 3A-3C, any of the operations may be repeated, performed in differ-ent orders, and/or performed in parallel with or in a partially overlapping in time manner with other operations.

Starting with FIG. 3A, in operation 300, a management controller (e.g., management controller 152, FIG. 1B) of a data processing system (e.g., data processing system 140, FIG. 1B; any of data processing systems 100, FIG. 1A) may obtain device pairing information (e.g., device pairing infor-mation 202, FIG. 2A) from a human interface device (HID) (e.g., HID 200, FIG. 2A).

As discussed above in reference to FIG. 2A, the device pairing information may be obtained by the management controller (e.g., from data processing system manager 110 of FIG. 1A) while the data processing system is in the preboot state or in a turned-off state. As also discussed above in reference to FIG. 2A, the device pairing information may be associated with any type of wireless communication method or protocol (e.g., WiFi, infrared, Bluetooth®, WiMax, wire-less cellular telephony, satellite, global positioning system (GPS), radio frequency (RF), near field communications (NFC), or the like).

In operation 302, as discussed above in reference to FIG. 2A, the management controller uses the device pairing information (e.g., during HID pairing process 204 of FIG. 2A) to pair the management controller with the HID.

During operations 300 and 302 of FIG. 3A, a physical dongle device (paired with the HID) is not connected to any external portions of the data processing system. Said another way, the pairing in operation 302 is directly with the management controller 152 without going through (e.g., using) any physical and externally connected dongle devices.

The process may end following operation 302.

Turning now to FIG. 3B, in operation 310, once a man-agement controller is paired with an HID, the management controller may obtain input instructions (e.g., input instruc-tions 210 of FIG. 2B) from the HID paired with management controller.

As discussed above in reference FIG. 2B, the input instructions may be obtained by the management controller while the date processing system is in a preboot state.

In operation 312, the management controller may provide the input instructions (e.g., after parsing and processing the input instructions as part of the input instruction forwarding process 212 of FIG. 2B) to hardware resources of the data processing system for the hardware resources to apply and execute (e.g., as part of the input instruction processing process 214 of FIG. 2B) the input instructions.

In embodiments, as discussed above in reference to FIG. 2B, applying and executing the input instructions by the hardware resources (e.g., hardware resources 150, FIG. 1B) thereby effectuates user interaction with the date processing system through the HID (paired with the management controller) while the data processing is in the preboot state.

Again, during the operations of FIG. 3B, a physical dongle device (paired with the HID) is not connected to any external portions of the data processing system. Thus, the HID is wirelessly paired with the data processing system through the management controller instead of through the physical dongle device.

The process may end following operation 312.

Finally, turning to FIG. 3C. in operation 320 and as discussed above in reference to FIGS. 2A-2C, the hardware resources of the data processing system may obtain (while the data processing system is in the preboot state) input instructions from the management controller (e.g., in the form of frame packets of the like) of the data processing system.

In operation 322, the hardware resources may process the input instructions to allow user interaction with the data processing system (using the HID) while the data processing system is in the preboot state.

Again in operations 320 and 322, a physical dongle device (paired with the HID) is not connected to any external portions of the data processing system. Thus, during the preboot state, the HID is paired with the management controller (instead of the physical dongle) that forwards input instructions to the hardware resources of the data processing system.

The process may end following operation 322.

Any of the components illustrated in FIGS. 1A-3C may be implemented with one or more computing devices. Turning to FIG. 4, a block diagram illustrating an example of a computing device (also referred to herein as "system 400") in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system-on-a-chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth® transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method comprising:

obtaining, by a management controller installed within a data processing system and while the data processing system is in a preboot state, input instructions from a human interface device (HID) that is wirelessly paired with the data processing system through the management controller instead of through a dongle device configured for the HID; and providing, by the management controller, the input instructions to hardware resources installed within the data processing system to cause the hardware resources to execute the input instructions while the data processing system is in the preboot state, wherein the hardware resources are configured with first wireless device connection capabilities, the first wireless device connection capabilities being off until the data processing system reaches a fully booted state after completing one or more actions required to be executed during the preboot state, and the management controller is configured with second wireless device connection capabilities that are separate and independent from the first wireless device connection capabilities, the second wireless device connection capabilities being on while the data processing system is in the preboot state, and the HID is paired with the management controller while the data processing system is in the preboot state using the second wireless device connection capabilities.

2. The method of claim 1, wherein the hardware resources comprise a first processor of the data processing system that is responsible for initiating and executing a bootup sequence of the data processing system, and the management controller comprises a second processor of the data processing system, the second processor being separate and independent from the first processor.

3. The method of claim 2, wherein the first processor is a main processor on which an operating system (OS) of the data processing system runs, and the management controller is unable to execute the bootup sequence of the data processing system.

4. The method of claim 2, wherein the management controller is a system-on-a-chip that operates independently of the first processor of the data processing system.

5. The method of claim 4, wherein the dongle device is not connected to the data processing system while the management controller is paired with the HID, and the HID is a Bluetooth® device.

6. The method of claim 5, wherein, in the preboot state, the data processing system is displaying a Basic Input/Output System (BIOS) of the data processing system to a user of the data processing system.

7. The method of claim 1, further comprising, before obtaining the input instructions:

obtaining, by the management controller and while the data processing system is in the preboot state or in a powered-off state, device pairing information from the HID; and using, by the management controller, the device pairing information to pair the management controller with the HID while the data processing system is still in the preboot state and while the dongle device configured for the HID is not connected to the data processing system.

8. The method of claim 1, wherein a start up of an operating system (OS) of the data processing system is not complete until the data processing system reaches the fully booted state, and once the data processing system reaches the fully booted state, the method further comprises:

providing, by the management controller, an HID profile of the HID to the hardware resources to automatically pair the HID paired with the management controller to the hardware resources without user intervention.

9. The method of claim 8, wherein automatically pairing the HID to the hardware resources comprises terminating, by the management controller, a first wireless connection between the management controller and the HID to allow a second wireless connection to be formed between the HID and the hardware resources, the first and second wireless connections being Bluetooth® connections.

10. A non-transitory machine-readable medium having instructions stored therein, which when executed by a management controller installed within a data processing system, cause the management controller to perform operations, the operations comprising:

obtaining, while the data processing system is in a preboot state, input instructions from a human interface device (HID) that is wirelessly paired with the data processing system through the management controller instead of through a dongle device configured for the HID; and providing the input instructions to hardware resources installed within the data processing system to cause the hardware resources to execute the input instructions while the data processing system is in the preboot state, wherein the hardware resources are configured with first wireless device connection capabilities, the first wireless device connection capabilities being off until the data processing system reaches a fully booted state after completing one or more actions required to be executed during the preboot state, and the management controller is configured with second wireless device connection capabilities that are separate and independent from the first wireless device connection capabilities, the second wireless device connection capabilities being on while the data processing system is in the preboot state, and the HID is paired with the management controller while the data processing system is in the preboot state using the second wireless device connection capabilities.

11. The non-transitory machine-readable medium of claim 10, wherein the hardware resources comprise a first processor of the data processing system that is responsible for initiating and executing a bootup sequence of the data processing system, and the management controller comprises a second processor of the data processing system, the second processor being separate and independent from the first processor.

12. The non-transitory machine-readable medium of claim 11, wherein the first processor is a main processor on which an operating system (OS) of the data processing system runs, and the management controller is unable to execute the bootup sequence of the data processing system.

13. The non-transitory machine-readable medium of claim 11, wherein the management controller is a system-on-a-chip that operates independently of the first processor of the data processing system.

14. The non-transitory machine-readable medium of claim 13, wherein the dongle device is not connected to the data processing system while the management controller is paired with the HID, and the HID is a Bluetooth® device.

15. A data processing system comprising:
hardware resources installed within the data processing system; and
a management controller installed within the data processing system, wherein the management controller stores instructions that cause the management controller to perform operations, the operations comprising:
obtaining, while the data processing system is in a preboot state, input instructions from a human interface device (HID) that is wirelessly paired with the data processing system through the management controller instead of through a dongle device configured for the HID; and
providing the input instructions to hardware resources installed within the data processing system to cause the hardware resources to execute the input instructions while the data processing system is in the preboot state, wherein
the hardware resources are configured with first wireless device connection capabilities, the first wireless device connection capabilities being off until the data processing system reaches a fully booted state after completing one or more actions required to be executed during the preboot state, and
the management controller is configured with second wireless device connection capabilities that are separate and independent from the first wireless device connection capabilities, the second wireless device connection capabilities being on while the data processing system is in the preboot state, and the HID is paired with the management controller while the data processing system is in the preboot state using the second wireless device connection capabilities.

16. The data processing system of claim 15, wherein
the hardware resources comprise a first processor of the data processing system that is responsible for initiating and executing a bootup sequence of the data processing system, and
the management controller comprises a second processor of the data processing system, the second processor being separate and independent from the first processor.

17. The data processing system of claim 16, wherein the first processor is a main processor on which an operating system (OS) of the data processing system runs, and the management controller is unable to execute the bootup sequence of the data processing system.

18. The data processing system of claim 16, wherein the management controller is a system-on-a-chip that operates independently of the first processor of the data processing system.

19. The data processing system of claim 18, wherein the dongle device is not connected to the data processing system while the management controller is paired with the HID, and the HID is a Bluetooth® device.

20. The data processing system of claim 19, wherein, in the preboot state, the data processing system is displaying a Basic Input/Output System (BIOS) of the data processing system to a user of the data processing system.

* * * * *